United States Patent [19]
Aziz

[11] Patent Number: 5,732,137
[45] Date of Patent: Mar. 24, 1998

[54] METHOD AND APPARATUS FOR SECURE REMOTE AUTHENTICATION IN A PUBLIC NETWORK

[75] Inventor: Ashar Aziz, Fremont, Calif.

[73] Assignee: Sun Microsystems, Inc., Mountain View, Calif.

[21] Appl. No.: 778,888

[22] Filed: Jan. 3, 1997

Related U.S. Application Data

[63] Continuation of Ser. No. 253,802, Jun. 3, 1994, Pat. No. 5,604,803.
[51] Int. Cl.⁶ .................................................. H04L 9/00
[52] U.S. Cl. .................................................. 380/25; 380/21
[58] Field of Search .................................... 380/21, 25

[56] References Cited

U.S. PATENT DOCUMENTS

| | | | |
|---|---|---|---|
| 5,434,918 | 7/1995 | Kung et al. | 380/25 |
| 5,592,553 | 1/1997 | Guski et al. | 380/25 |
| 5,604,803 | 2/1997 | Aziz | 380/25 |

*Primary Examiner*—Salvatore Cangialosi
*Attorney, Agent, or Firm*—Irell & Manella LLP

[57] ABSTRACT

A client workstation provides a login address as an anonymous ftp (file transfer protocol) request, and a password as a user's e-mail address. A destination server compares the user's e-mail address provided as a password to a list of authorized users' addresses. If the user's e-mail address is located on the list of authorized users' addresses maintained by the destination server, the destination server generates a random number (X), and encrypts the random number in an ASCII representation using encryption techniques provided by the Internet Privacy Enhanced Mail (PEM) procedures. The encrypted random number is stored in a file as the user's anonymous directory. The server further establishes the encrypted random number as one-time password for the user. The client workstation initiates an ftp request to obtain the encrypted PEM random number as a file transfer (ftp) request from the destination server. The destination server then sends the PEM encrypted password random number, as an ftp file, over the Internet to the client workstation. The client workstation decrypts the PEM encrypted file utilizing the user's private RSA key, in accordance with established PEM decryption techniques. The client workstation then provides the destination server with the decrypted random number password, which is sent in the clear over the Internet, to login to the destination server. Upon receipt of the decrypted random number password, the destination server permits the user to login to the anonymous directory, thereby completing the user authentication procedure and accomplishing login.

31 Claims, 4 Drawing Sheets

METHOD AND APPARATUS FOR SECURE REMOTE AUTHENTICATION IN A PUBLIC NETWORK

This is a continuation of application Ser. No. 08/253,802, filed Jun. 3, 1994, now U.S. Pat. No. 5,604,803.

BACKGROUND OF THE INVENTION

1. Field of the Invention

The present invention relates to methods and apparatus for providing remote user authentication in a public network. More particularly, the present invention provides methods and apparatus for remote authentication using a one-time password scheme having a secure out-of-band channel for initial password delivery.

2. Art Background

Over the past few years, the networking of computers for electronic mail ("e-mail") communication and data transfer has grown from simple local area networks to a global network referred to as the "Internet". The Internet comprises a spiderweb of networks which criss-cross the globe and permit users to send and receive e-mail messages, transfer data and access remote data bases between computers coupled to servers. In addition to fixed positions on the Internet, computer systems, such as for example, lap top computers, may be physically moved from one location on the network to another. Wireless links coupling the computers to the Internet, such as direct satellite links, also permit users to access the Internet from remote areas.

As the number of users on the Internet has grown, so have concerns regarding network security. Many businesses and government organizations utilize the Internet for the transfer of business information, government project data and other information which may be considered confidential. Due to the size and complexity of the Internet, the opportunity for an intruder to intercept messages and gain access to confidential information has become a significant concern. The Internet community has established message encryption and authentication procedures for Internet electronic mail. These encryption and authentication procedures are known as privacy enhanced mail (PEM). The PEM protocol establishes procedures to provide for enhanced privacy in e-mail services over the Internet. The PEM protocol is intended to be compatible with a wide range of key management approaches including symmetric (secret key) and asymmetric (public key) approaches for the encryption of data encrypting keys. Privacy enhanced mail services assure message integrity, and are offered through the use of end-to-end cryptography between originator and recipient processes at or above the user level. No special processing requirements are imposed on the message transfer system at endpoints, or at intermediate relay sites on the Internet. The reader is referred to the PEM RFC documents, which are incorporated herein by reference, entitled: "Privacy Enhancement for Internet Electronic Mail", Parts I–IV, RFCS 1421–1424, available on the Internet at /home/internet/rfcs on files rfc1421–rfc1424 (hereinafter at times referred to as "PEM Protocols").

However, although privacy enhanced mail service is available on the Internet, all current applications on the Internet (commonly referred to as "legacy" applications), such as Telnet, File Transfer Protocol ("ftp"), and the like, use simple authentication having reusable passwords. Although it is generally understood that strong authentication using crypto-techniques would provide enhanced password security on the Internet, retrofitting the existing installed base of network applications with such a strong authentication mechanism would take some period of time. In the interim, an intruder can monitor the network and intercept passwords transmitted over the Internet. Since all passwords are currently transmitted from user to a remote server in unencrypted ("clear") form, Internet users are vulnerable to an intruder determining their password, and later logging on to a server utilizing the stolen password of a legitimate user. In fact, there have been cases where intruders have tapped the Internet at well known public sites and have accumulated literally thousands of legitimate valid passwords. Thus, the Internet must be viewed as a large insecure channel in which passwords are transmitted in the clear, and may be acquired by unauthorized parties.

As will be described, the present invention provides methods and apparatus to permit an Internet user to acquire a password which is good for only a one time use. Through the use of the existing privacy enhanced mail system on the Internet, the present invention ensures that only the legitimate user can gain access to the password. Moreover, as will be described, the present invention does not require the retrofitting of existing applications and computers with a strong authentication mechanism.

SUMMARY OF THE INVENTION

The present invention provides an improved method and apparatus for user authentication in a network environment between a client computer ("workstation") and a remote destination server coupled to a network. A user operating the client workstation provides a login address as an anonymous ftp (file transfer protocol) request, and a password as the user's e-mail address. The destination server compares the user's e-mail address provided as a password to a list of authorized users' addresses. If the user e-mail address provided is not on the destination server's list of authorized user addresses, then the user login request is automatically denied. If the user's e-mail address is located on the list of authorized users' addresses maintained by the destination server, the destination server generates a random number (X), and encrypts the random number in an ASCII representation using encryption techniques provided by the Internet Privacy Enhanced Mail (PEM) message and encryption authentication procedures. The encrypted random number is stored in a file as the user's anonymous directory. The server further establishes the encrypted ASCII representation of the random number as one-time password for the user. The client workstation initiates an ftp request to obtain the encrypted PEM random number as a file transfer (ftp) request from the destination server. The destination server then sends the PEM encrypted password random number, as an ftp file, over the Internet to the client workstation. The client workstation decrypts the PEM encrypted file utilizing the user's private RSA key, in accordance with established PEM decryption techniques. The client workstation then provides the destination server with the decrypted random number password, which is sent in the clear over the Internet, to login to the destination server. Upon receipt of the decrypted random number password, the destination server permits the user to login to the anonymous directory, thereby completing the user authentication procedure and accomplishing login. The destination server removes the random number password from its anonymous directory, such that any future login attempts requires a new random number password. Additionally, the destination server deems the random number password valid only for a predetermined time period (t), such that any delay beyond the time period (t) in accomplishing the login by the client workstation results in a timeout, and invalidation of the random number password. In the event of a timeout, the user must obtain a new random number password from the destination server in accordance with the method of the present invention.

NOTATION AND NOMENCLATURE

Figure 1:
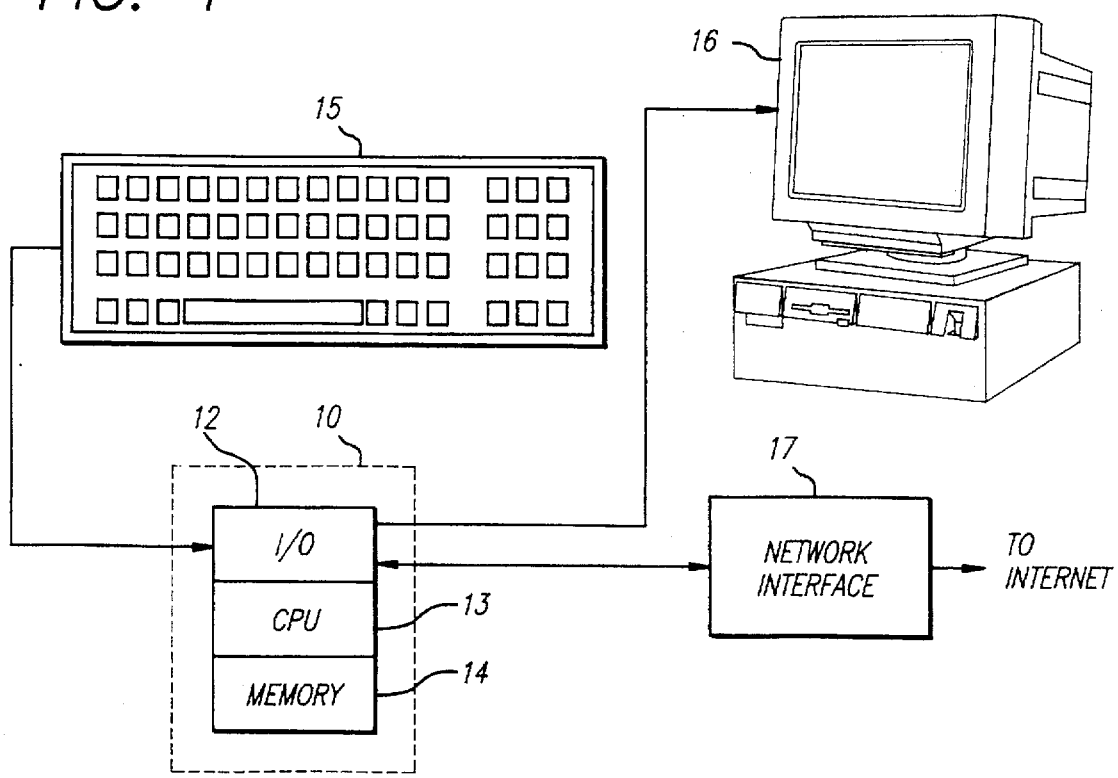
FIG. 1 illustrates a work station used to communicate with other workstations over a network and incorporating the teachings of the present invention.

The detailed descriptions which follow are presented largely in terms of symbolic representations of operations of data processing devices coupled to a network. These process descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities may take the form of electrical or magnetic signals capable of being stored, transferred, combined, compared, displayed and otherwise manipulated. It proves convenient at times, principally for reasons of common usage, to refer to these signals as bits, values, elements, symbols, operations, messages, terms, numbers, or the like. It should be borne in mind, however, that all of these similar terms are to be associated with the appropriate physical quantifies and are merely convenient labels applied to these quantities.

In the present invention, the operations referred to are machine operations. Useful machines for performing the operations of the present invention include general purpose digital computers (referred herein as "workstations"), or other similar devices. In all cases, the reader is advised to keep in mind the distinction between the method operations of operating a computer and the method of computation itself. The present invention relates to method steps for operating a computer, coupled to a series of networks, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method/process steps presented herein are not inherently related to any particular computer or other apparatus. Various general purpose machines may be used with programs in accordance with the teachings herein, or it may prove more convenient to construct specialized apparatus to perform the required method steps. The required structure for a variety of these machines will be apparent from the description given below.

DETAILED DESCRIPTION OF THE INVENTION

In the following description, numerous details are set forth such as workstation system configurations, representative messages, servers, etc., to provide a thorough understanding of the present invention. However, it will be apparent to one skilled in the art that the present invention may be practiced without these specific details. In other instances, well known circuits and structures are not described in detail in order to not obscure the present invention. Moreover, certain terms such as "knows", "sends", "receives", "verifies", "examines", "finds", "determines", "authenticates", etc., are used in this Specification and are considered to be terms of art. The use of these terms, which to a casual reader may be considered personifications of computer or electronic systems, refers, for simplicity, to the functions of the system as having human-like attributes. For example, a reference herein to an electronic system as "determining" something is simply a shorthand method of describing that the electronic system has been programmed or otherwise modified in accordance with the teachings herein. The reader is cautioned not to confuse the functions described with everyday human attributes. These functions are machine functions in every sense.

FIG. 1 illustrates a data processing system (hereinafter a "workstation") in accordance with the teachings of the present invention. The workstation includes a computer 10 which comprises three major components. The first of these is an input/output (I/O) circuit 12 which is used to communicate information in appropriately structured form to and from other portions of the computer 10. In addition, computer 10 includes a central processing unit (CPU) 13 coupled to the I/O circuit 12 and a memory 14. These elements are those typically found in most general purpose computers and, in fact, computer 10 is intended to be representative of a broad category of data processing devices. Also shown in FIG. 1 is a keyboard 15 to input data and commands into computer 10, as is well known. A network interface circuit 17 is also coupled to the computer 10 through I/O circuit 12, to permit the computer 10 to communicate with other workstations and servers over a network, such as for example, the Internet. A raster display monitor 16 is shown coupled to the I/O circuit 12 and is used to display images generated by CPU 13 in accordance with the present invention. Any well known variety of cathode ray tube (CRT) or other type of display may be utilized as display 16.

Figure 2:
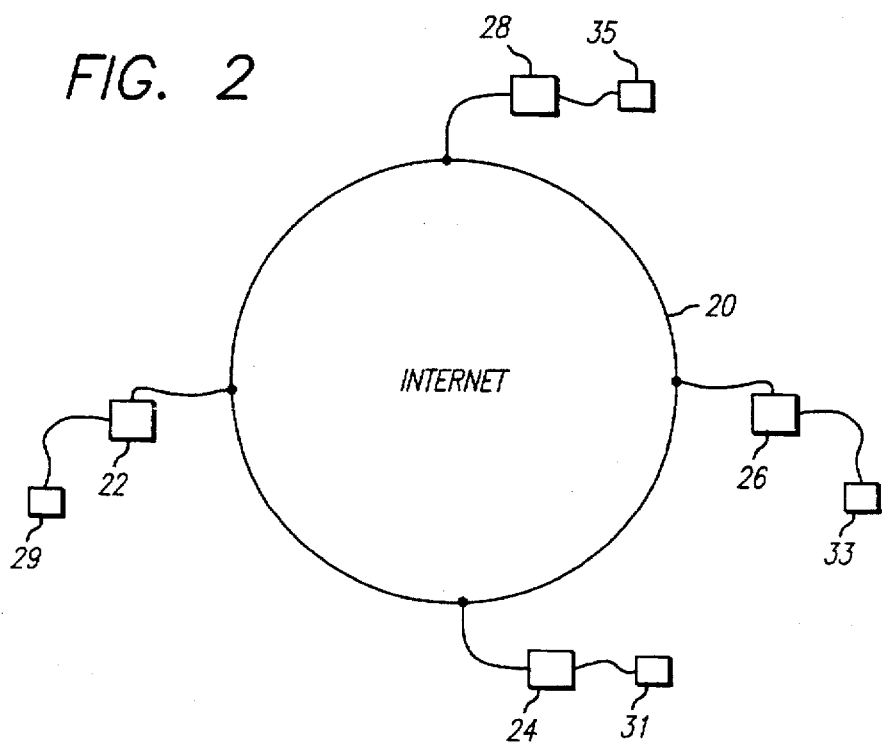
FIG. 2 conceptually illustrates the Internet network.

Referring now to FIG. 2, the Internet may be conceptually described as an open network generally referred to in the figure by the numeral 20, to which numerous servers 22, 24, 26 and 28 are coupled. Each of the respective servers is coupled to workstations 29, 31, 33 and 35, as shown. It will be appreciated that FIG. 2 is described for illustration purposes only, and that in reality the Internet includes many tens of thousands of servers and work stations. Additionally, although the Internet is illustrated in FIG. 2 as a single network, it will be appreciated that the Internet is actually a series of networks forming a spiderweb-like topology spanning virtually every continent in the world. As is well known, a user operating a workstation in, for example, Singapore, may send messages, access data and databases and execute a variety of functions over the Internet to, for example, a workstation located in Mountain View, Calif.

In the operation of many networks, and in particular, the Internet, a user operating for example workstation 29, referred to as the "client workstation", may wish to access a workstation 33 which, as illustrated, is coupled to the server 26. The server 26 is referred to in the industry as the "destination server" and the combination of client workstation 29 and server 26 is known as the "client-server". Generally, in order for client workstation 29 to access destination server 26 and data which may be disposed at the server 26, or alternatively, at a workstation 33, it is necessary for the client workstation 29 to provide a password to the server 26. However, as previously noted, passwords are sent over the Internet 20 in "the clear" thereby giving intruders access to unencrypted passwords. Additionally, passwords are relatively easy to guess given a sufficiently powerful workstation eavesdropping at a node on the Internet. Once an unencrypted password has been captured by an intruder the intruder may then access the network devices as an authorized user. Thus, the sending of passwords in the clear over the Internet provides an opportunity for a would be intruder to gain access to an authorized user's password, and thereby compromises network security.

In accordance with the teachings of the present invention, assume for sake of example, that a client workstation 29 desires to access a destination server 26 coupled to the Internet 20. In order to access the destination server 26 it is necessary for the client workstation 29 to login on the server 26. The login by the client workstation 29 to server 26 is an authenticated login in accordance with the teachings of the invention. Traditionally, the client workstation 29 would simply provide a password to the destination server 26 in the clear over the Internal 20. However, for the reasons previously described, the sending of a password in the clear compromises network security and provides an unacceptable opportunity for intrusion by third parties. One of the characteristics of the present invention is that its methodology operates in conjunction with existing network applications. As previously described, one of the existing network applications on the Internet is privacy enhancement for Internet electronic mail (PEM). Each of the servers (in FIG. 1 servers 22, 24, 26 and 28) coupled to the Internet 20 includes PEM, as does each of the workstations 29, 31, 33 and 35. Generally, PEM is designed to receive a user name (e-mail address) and to fetch its corresponding public key certificate. In general, PEM provides public key cryptography for electronic mail messages, and security for the mail message itself, as opposed to the authentication of an authorized user. The detailed operation of privacy enhanced mail will not be described in this Specification, since it is well established and currently functioning on the Internet. The reader is referred to the Internet documents, incorporated by reference herein, entitled "Privacy Enhancement for Internet Electronic Mail", parts I–IV, (RFC 14.21 through 14.24) for a detailed description of PEM encryption and authentication procedures. The present invention will be described herein as it relates to its operation in conjunction with the existing Internet PEM system. However, it will be appreciated that the present invention may be used in numerous other network environments in addition to the Internet.

Figure 3:
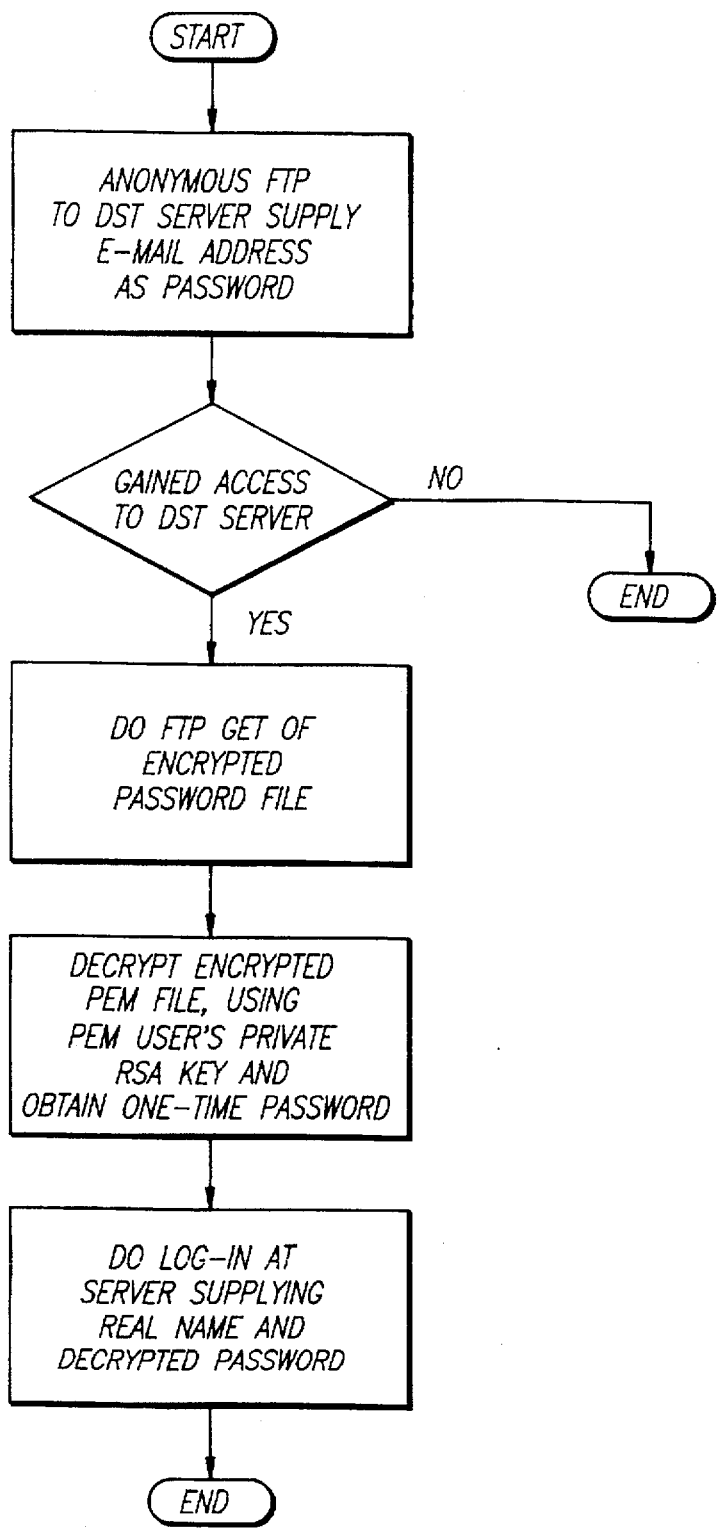
FIG. 3 is a flow chart illustrating the sequence of steps executed by a user's workstation of the type illustrated in FIG. 1.
Figure 4:
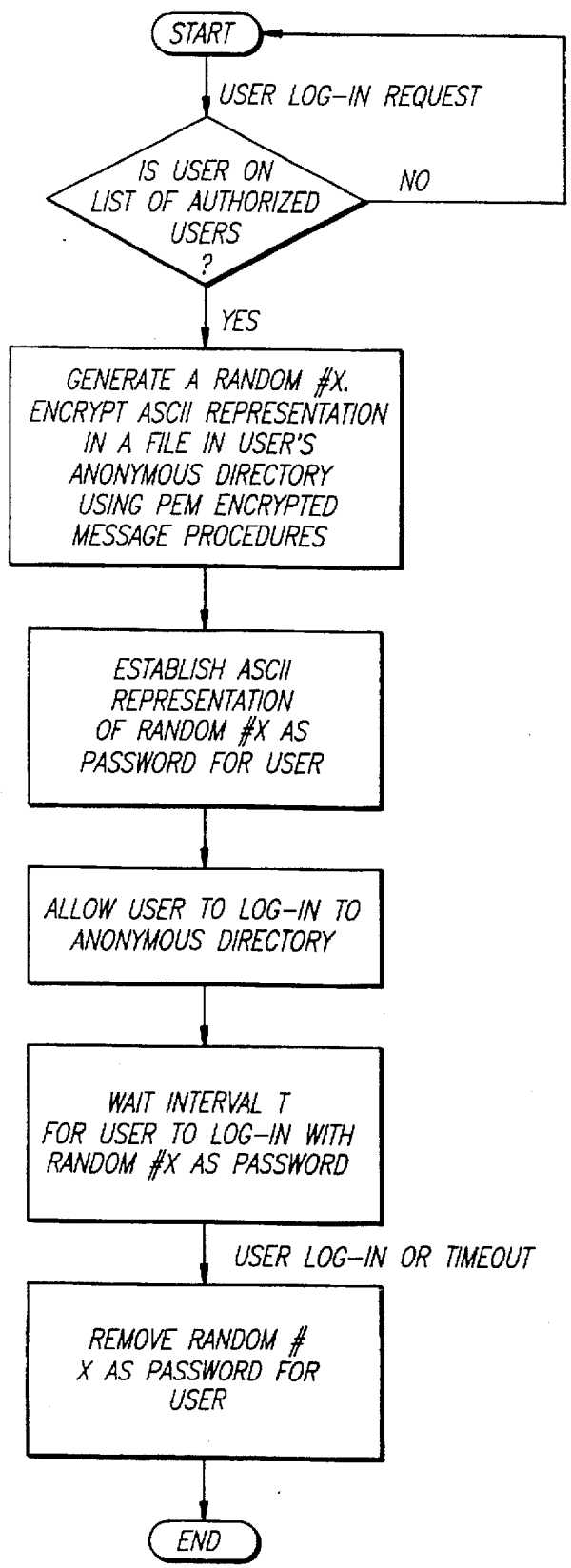
FIG. 4 is a flow chart illustrating the sequence of steps for the present invention's privacy enhanced mail based user authentication system, executed by a server data processing device.
Figure 5:
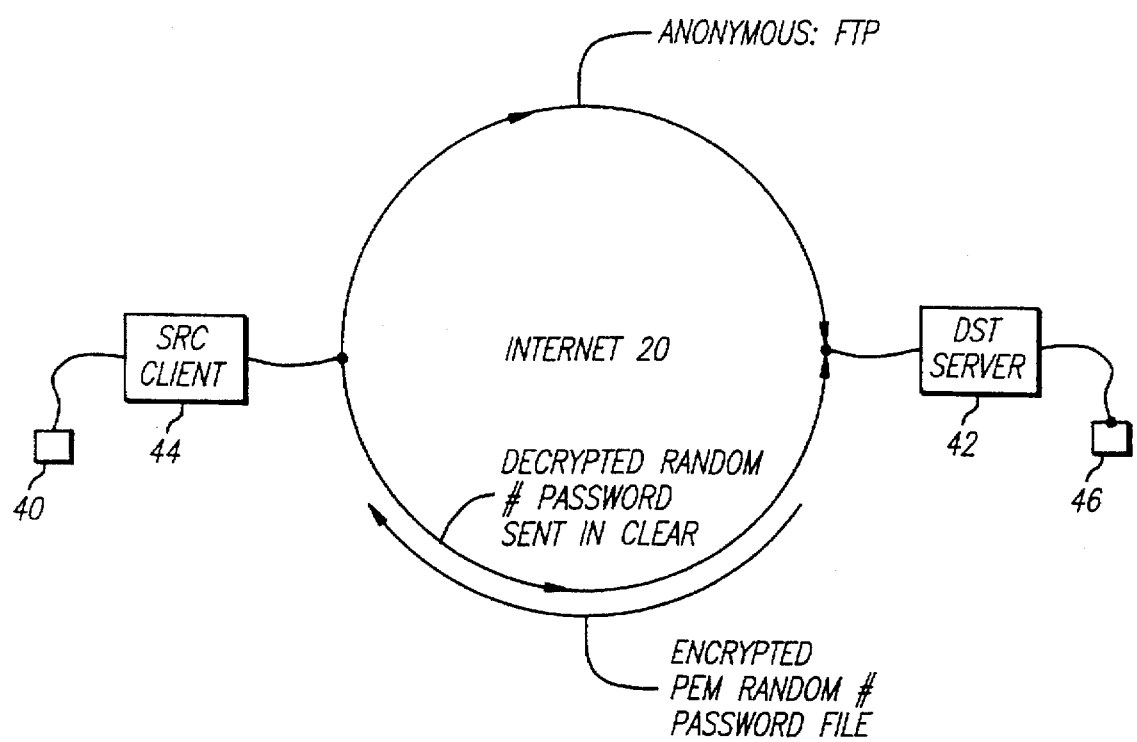
FIG. 5 is a diagrammatical illustration of the data paths utilized by the present invention for providing an encrypted password using privacy enhanced mail, and the use of the decrypted password sent over the Internet in accordance with the teachings of the present invention to accomplish login.

Referring now to FIGS. 3 and 4 in conjunction with FIG. 5, the operation of the present invention will be described in further detail. Assume for sake of example that a client workstation 40 (see FIG. 5) coupled to the Internet 20 desires to login on a destination server 42. As shown in FIG. 5, the client workstation 40 is coupled to a source server 44, and the destination server 42 is coupled to at least one workstation 46, as is common in Internet topology.

As illustrated in the flowchart of FIG. 3, the client workstation 40 through the source server 44 provides a login comprising an anonymous ftp, to the destination server 42. In addition, the client workstation 40 provides a password comprising the user's electronic mail name. The use of an anonymous ftp provided over the Internet 20 effectively results in a secure password channel over the Internet. This password is then used to secure another Internet connection. As illustrated in FIG. 4, the destination server 42 receives the login request comprising an anonymous ftp in conjunction with the user's e-mail address as a password. The destination server 42 compares the client workstation 40 electronic mail name to its list of authorized users. If the user's electronic mail name (in the present example, client workstation 40) is not on the list of authorized users, the client login request is rejected.

If the identified user is on the list of authorized users, then, as illustrated in FIG. 4, the destination server 42 generates a random number (X) which will be used as a one-time password. An ASCII representation of the random number is encrypted using the PEM algorithm, and is placed in a file in the user's anonymous directory using PEM encrypted message procedures. As shown in FIG. 4, the destination server 42 establishes the encrypted ASCII representation of the random number X as the one-time password for the user.

It will be appreciated that the encrypted random number password is addressed only to the user operating workstation 40. Only the authorized user operating workstation 40 can decrypt the encrypted random number password. As illustrated in the flowchart of FIG. 3, the client workstation 40 does an ftp to obtain the encrypted PEM random number password from the destination server 42. The destination server 42 sends the encrypted PEM random number password to the workstation 40 over the Internet 20. Although an inhaler can detect the encrypted random number password over the Internet 20, only the authorized user of workstation 40 can decrypt the random number password in accordance with the teachings of PEM. The workstation 40, using the PEM decryption methodology, decrypts the encrypted PEM file using the PEM users private RSA key.

The reader is referred to the document, incorporated by reference herein, by Fahn, "Answers to Frequently Asked Questions about Today's Cryptography" (RSA Laboratories, 1992), submitted concurrent with the filing of the application on which this patent is based, and other references submitted, for a detailed description of RSA technology. Since the RSA technology is well known, it will not be described further herein.

As shown in the flowchart of FIG. 3, once the PEM encrypted random number password is decrypted by the client workstation 40 using its private key, the decrypted password is then supplied over the Internet 20 to the destination server 42 for login. For the actual login by the client workstation 40 to the destination server 42, the decrypted random number password is sent in the clear over the Internet 20 along with the user's e-mail address name.

As shown in FIG. 4, the destination server 42 permits the user to login to the anonymous directory utilizing the one-time random number password within a predetermined time (t). Providing a predetermined time window in which to permit the client workstation 40 to login to the destination server 42, provides additional security.

In the event the time period (t) expires without the workstation 40 logging into the destination server 42 utilizing the decrypted random number password, then a time out occurs and the random number password is deemed invalid. In such event, it is necessary for the user operating the client workstation 40 to acquire a new random number password utilizing the teachings described in this Specification with reference to FIGS. 3 and 4. Assuming that the user provides the decrypted random number password to the destination server 42 within the time interval (t), the destination server 42 permits the login and the user authentication process is completed. The destination server 42 then removes the random number X as a password for the user, thereby requiring any future logins by the workstation 40 to first obtain a new random number password. Thus, each login between a client and a server over the Internet requires a new password.

It will be appreciated that since the decrypted random number password provided by the client workstation 40 to the destination server 42 over the Internet 20 is sent in the clear, an intruder can detect this password during the login process. However, since the server 42 invalidates or removes the random number password after each successful login, or alternatively, after the time out of the interval (t), network security is not compromised. Even assuming an intruder intercepts the decrypted random number password over Internet 20, it is of no use to the intruder since it is only valid for a single login, and the login must occur during the predetermined time (t).

Accordingly, a system and method for user authentication in a public network is disclosed. While the present invention has been described in conjunction with a few specific embodiments identified in FIGS. 1–5, it will be apparent to those skilled in the art that many alternatives, modifications and variations in light of the foregoing description are possible. For example, although the present invention has been described with reference to user authentication in the Internet environment, it will be appreciated that the teachings of the present invention may be applied to any public or private network topology.

I claim:

1. A method for authentication of a remote user of a computer system, comprising the steps of:
   receiving a user identification code of said remote user and determining if said user identification code is authorized;
   if said user identification code is authorized, generating a one time password, storing said one time password and encrypting said one time password to form an encrypted one time password;
   providing said encrypted one time password to said remote user;
   receiving from said remote user a decrypted one time password which is decrypted from said encrypted one time password, and comparing said decrypted one time password to said stored one time password, such that, if said received and stored one time passwords match, said remote user is authenticated.

2. The method as in claim 1 wherein said step of generating is configured to generate a random number as said one time password.

3. The method as in claim 1 wherein if said decrypted one time password is not received within a predetermined time t from said remote user, said stored one time password is invalidated for further use.

4. The method as in claim 1 wherein the step of receiving a user identification code includes the step of receiving an anonymous ftp request from the user as a login.

5. A computer system which embodies authentication of a remote user, comprising:
   an input and output device including an interface to the remote user;
   a storage device; and
   a processing device configured to:
   receive a user identification code of said remote user via the interface;
   determine if said user identification code is authorized;
   if said user identification code is authorized, generate a one time password, store said one time password in said storage device and encrypt said one time password to form an encrypted one time password;
   transmit via said interface said encrypted one time password to said remote user;
   receive from said remote user a decrypted one time password which has been decrypted from said encrypted one time password, and compare said decrypted one time password to said stored one time password, such that, if said received and stored one time passwords match, said remote user is authenticated.

6. The computer system as in claim 5 wherein said processing device is further configured to generate a random number as said one time password.

7. The computer system as in claim 5 wherein said processing device is further configured such that if said decrypted one time password is not received within a predetermined time t from said remote user, said stored one time password is invalidated for further use.

8. The computer system as in claim 5 wherein said processing device is further configured to receive an anonymous ftp request from the remote user as a login.

9. A computer program product comprising:
   a computer usable medium having computable readable code embodied therein that authenticates a remote user of a computer system, the computer readable code comprising:
   a first module which is configured to receive a user identification code of said remote user and determine if said user identification code is authorized;
   a second module, which is operatively coupled to the first module and which is configured to, if said user identification code is authorized, generate a one time password, store said one time password and encrypt said one time password to form an encrypted one time password;
   a third module, which is operatively coupled to the second module and which is configured to provide said encrypted one time password to said remote user;
   a fourth module, which is operatively coupled to the third module and which is configured to receive from said remote user a decrypted one time password which has been decrypted from said encrypted one time password, and compare said decrypted one time password to said stored one time password, such that, if said received and stored one time passwords match, said remote user is authenticated.

10. The computer program product as in claim 9 wherein said second module is further configured to generate a random number as said one time password.

11. The computer program product as in claim 9 wherein said second module is further configured to store said one time password for a predetermined time t, such that if said decrypted one time password is not received within said time t from said remote user, said stored one time password is invalidated for further use.

12. The computer program product as in claim 9 wherein said first module is further configured to receive an anonymous ftp request from the user as a login.

13. A method of authentication of a user for access to a remote computer system, comprising the steps of:
   providing a user identification code of said user to said remote computer to be used to determine if said user identification code is authorized;
   if said user identification code is authorized, receiving an encrypted one time password from said remote computer which has been encrypted from a stored one time password; and
   decrypting said encrypted one time password and providing said decrypted one time password to said remote computer, whereby the user is authenticated if said decrypted one time password matches said stored one time password.

14. The method as in claim 13 wherein said stored one time password is a random number.

15. The method as in claim 13 wherein said step of providing said decrypted one time password requires said decrypted one time password be provided to said remote computer within a predetermined time t for which said stored one time password is stored at the remote computer, beyond which the remote computer would have invalidated said stored one time password for further use.

16. The method as in claim 13 wherein said step of providing a user identification code includes the step of providing an anonymous ftp request as a login to the remote computer.

17. A computer system which authenticates a user of the system for access to a remote computer, comprising:
   an input and output device including an interface to the remote computer;
   a storage device; and
   a processing device configured to:
      provide a user identification code of said user to said remote computer system via said interface to be used to determine if said user identification code is authorized,
      if said user identification code is authorized, receive via said interface an encrypted one time password from said remote computer which has been encrypted from a stored one time password, and
      decrypt said encrypted one time password and provide said decrypted one time password to said remote computer via said interface, whereby the user is authenticated if said decrypted one time password matches said stored one time password.

18. The computer system as in claim 17 wherein said stored one time password is a random number.

19. The computer system as in claim 17 wherein said processing device is further configured to provide an anonymous ftp request to the remote computer as a login.

20. A computer program product comprising:
   a computer useable medium having computable readable code embodied therein for authenticating a user for access to a remote computer system, the computer readable code comprising:
      a first module configured to provide a user identification code of said user to said remote computer to be used to determine if said user identification code is authorized;
      a second module which is operatively coupled to the first module and which is configured to, if said user identification code is authorized, receive an encrypted one time password from said remote computer which has been encrypted from a stored one time password; and
      a third module which is operatively coupled to the second module and which is configured to decrypt said encrypted one time password and provide said decrypted one time password to said remote computer, whereby the user is authenticated if said decrypted one time password matches said stored one time password.

21. The computer program product as in claim 20 wherein said stored one time password is a random number.

22. The computer program product as in claim 20 wherein said first module is further configured to provide an anonymous ftp request to the remote computer system as a login.

23. A method for user authentication between a first computer and a second computer, comprising the steps of:
   providing from said first computer to said second computer a user identification code identifying a user of said first computer;
   receiving by said second computer said user identification code and determining if said user identification code is authorized, such that if said user identification code is authorized, said second computer:
      generates a one time password;
      stores said one time password; and
      encrypts said one time password to form an encrypted one time password;
   providing by said second computer said encrypted one time password to said first computer;
   decrypting by said first computer said one time password and providing said decrypted one time password to said second computer; and
   comparing by said second computer said decrypted one time password to said stored one time password, such that, if said received and stored one time passwords match, said user is authenticated.

24. The method as in claim 23 wherein said one time password generated by said second computer is a random number.

25. The method as in claim 23 wherein said first computer also provides to the second computer an anonymous ftp request as a login along with said user identification code.

26. A system for user authentication between a first computer and a second computer, comprising:
   an element included in said first computer which is structured to provide to said second computer a user identification code identifying a user of said first computer;
   an element included in said second computer which is structured to receive said first request and determining if said user identification code is authorized, such that if said user identification code is authorized, said second computer:
      generates a one time password;
      stores said one time password; and
      encrypts said one time password to form an encrypted one time password;
   a transmission element included in said second computer which is structured to provide said encrypted one time password to said first computer;
   a decrypting element included in said first computer which is structured to decrypt said one time password and providing said decrypted one time password to said second computer; and
   wherein said second computer compares said received decrypted one time password to said stored one time password, such that, if said received and stored one time passwords match, said user is authenticated.

27. The system as in claim 26 wherein the one time password generated by the second computer is a random number.

28. The system as in claim 26 wherein said element included in said first computer which is structured to provide to said second computer said user identification code is also structured to provide to the second computer an anonymous ftp request as a login.

29. A computer program product comprising:
a computer useable medium having computable readable code embodied therein for user authentication between a first computer and a second computer, the computer readable code comprising:
  a first module which is configured to provide from said first computer to said second computer a user identification code identifying a user of said first computer;
  a second module which is coupled to the first module and which is structured to receive by said second computer said user identification code and determining if said user identification code is authorized, such that if said user identification code is authorized, said second computer:
    generates a one time password;
    stores said one time password; and
    encrypts said one time password to form an encrypted one time password;
  a third module which is coupled to the second module and which is structured to provide by said second computer said encrypted one time password to said first computer;
  a fourth module which is coupled to the third module and which is structured to decrypt by said first computer said one time password and provide said decrypted one time password to said second computer; and
  a fifth module which is coupled to the fourth module and which is structured to compare by said second computer said decrypted one time password to said stored one time password, such that, if said received and stored one time passwords match, said user is authenticated.

30. The computer program product as in claim 29 wherein said second module is further configured to generate a random number as said one time password.

31. The computer program product as in claim 29 wherein the first module is further configured to provide by the first computer to the second computer an anonymous ftp request as a login along with said user identification code.

* * * * *